(12) United States Patent
Caldwell

(10) Patent No.: US 8,298,407 B1
(45) Date of Patent: Oct. 30, 2012

(54) GAS VENT

(76) Inventor: Dennis Paul Caldwell, Borger, TX (US)

( * ) Notice: Subject to any disclaimer, the term of this patent is extended or adjusted under 35 U.S.C. 154(b) by 0 days.

(21) Appl. No.: 13/412,427

(22) Filed: Mar. 5, 2012

(51) Int. Cl.
*B01D 35/00* (2006.01)

(52) U.S. Cl. ............ 210/95; 210/120; 210/123; 96/165; 137/202

(58) Field of Classification Search ............... 210/120, 210/123, 95; 96/165; 137/202, 157
See application file for complete search history.

(56) References Cited

U.S. PATENT DOCUMENTS

| | | | | |
|---|---|---|---|---|
| 2,231,341 A | * | 2/1941 | Lichte | 96/165 |
| 2,252,687 A | * | 8/1941 | Bassett | 137/202 |
| 3,421,625 A | * | 1/1969 | Fritz | 210/101 |
| 6,736,964 B1 | * | 5/2004 | Caldwell | 210/87 |
| 7,364,609 B2 | * | 4/2008 | MacDuff | 96/165 |

* cited by examiner

*Primary Examiner* — Terry Cecil
(74) *Attorney, Agent, or Firm* — Martin S. High, P.C.

(57) ABSTRACT

Embodiments of the Gas Vent are comprised of a horizontal float assembly, and a vertical gas valve assembly. The horizontal float assembly is connected via a fluid connection to a surge tank or any other connection to the overall gas processing system. The horizontal float assembly is comprised of a housing; a horizontal float; a flange; a sight glass; one or more sight glass valves; a horizontal float lever arm; a vertical valve hinge arm, and a hinge. The housing of the horizontal float assembly is essentially a large hollow process vessel with various openings and fittings formed by the housing to accept the various devices and. The horizontal float is a large, hollow vessel that partially floats on top of any liquid contained within the horizontal float assembly. As the horizontal float rises and falls in conjunction allowing gas to vent as it is accumulated.

14 Claims, 3 Drawing Sheets

GAS VENT

CROSS-REFERENCE TO RELATED APPLICATIONS

Not applicable

STATEMENT REGARDING FEDERALLY SPONSORED RESEARCH OR DEVELOPMENT

Not applicable

FIELD OF THE EMBODIMENTS

The field of the embodiments is oil field equipment.

BACKGROUND OF THE EMBODIMENTS

When oil, water, and gas leave and well it is necessary to meter the volumes of each of the components produced. For well testing results, the oil, water, and gas must have separate meters. The water and oil can be separated and each one metered separately by using a well test such as that described in U.S. Pat. No. 6,736,964. Prior to the water and oil entering into the well tester, all the gas must be removed from the liquids.

Previous methods have employed various devices that permit too much oil droplets to escape with the removal of the gas, and also do not remove all of the gas.

SUMMARY OF THE EMBODIMENTS

In summary, the embodiments of the Gas Vent are comprised of a horizontal float assembly, and a vertical gas valve assembly. The horizontal float assembly is connected via a fluid connection to a surge tank or any other connection to the overall gas processing system. The horizontal float assembly is comprised of a housing; a horizontal float; a flange; a sight glass; one or more sight glass valves; a horizontal float lever arm; a vertical valve hinge arm, and a hinge. The housing of the horizontal float assembly is essentially a large hollow process vessel with various openings and fittings formed by the housing to accept the various devices and connections for the horizontal float assembly to function including, without limitation, connections for the flange, the sight glass, the one or more sight glass valves, and the hinge. The horizontal float is a large, hollow vessel that partially floats on top of any liquid contained within the horizontal float assembly. The flange serves to enclose an end of the housing. As the horizontal float rises and falls in conjunction with the level of the petroleum liquid, there is resultant buoyant force acting on the horizontal float. Alternatively, the pressure of the gas above the horizontal float forces the horizontal float downward. The downward movement of the horizontal float lowers the plunge valve allowing gas to escape.

In this respect, it is to be understood that the embodiments in this application are not limited to the details of construction and to the arrangements of the components set forth in the description or illustrated in the drawings. The embodiments are capable of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the embodiments described in this application. Additional benefits and advantages of the present embodiments will become apparent in those skilled in the art to which the embodiments relate from the description of the preferred embodiment and the appended claims, taken in conjunction with the accompanying drawings. It is important, therefore, that the claims be regarded as including such equivalent constructions insofar as they do not depart from the spirit and scope of the embodiments described herein.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figure 1:
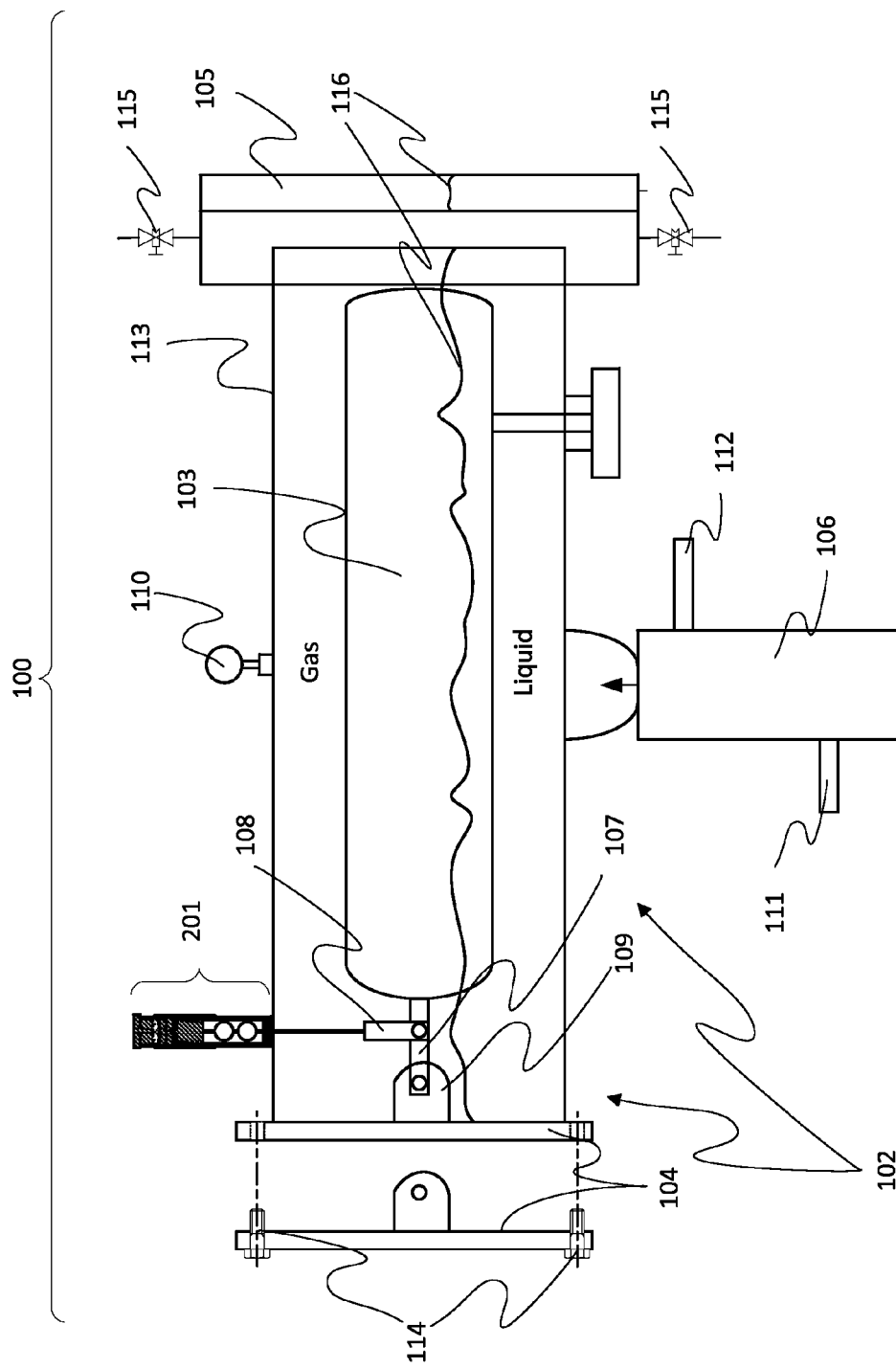
FIG. 1 is a schematic of an embodiment of the Gas Vent showing a side schematic view.
Figure 2:
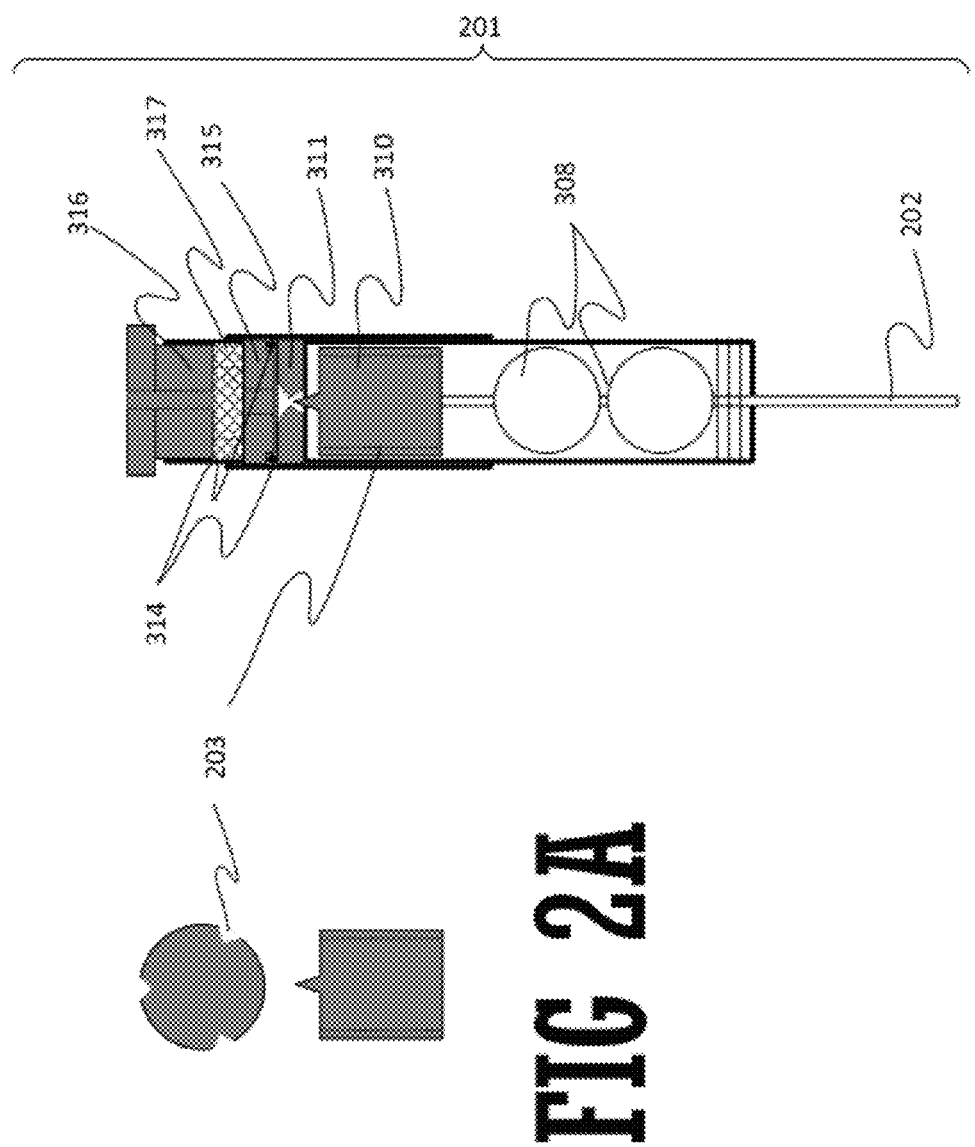
FIG. 2A top and side view of the plunge valve of an embodiment of the vertical gas valve assembly.
FIG. 2B is a side view of the vertical gas valve assembly.
Figure 3:
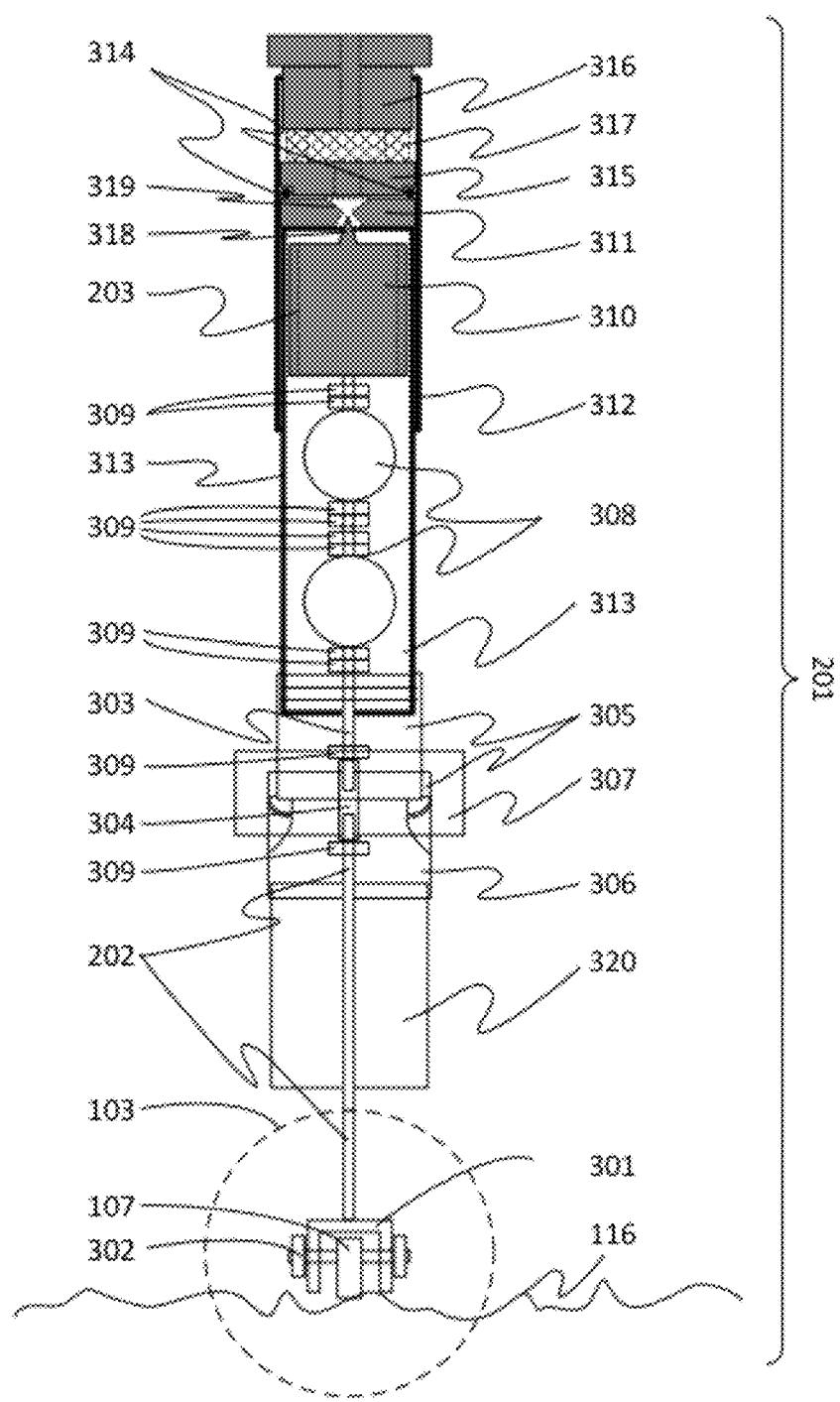
FIG. 3 is a detailed schematic of a side view of the vertical gas valve assembly.

An embodiment of the Gas Vent 100 is comprised of a horizontal float assembly 102, and a vertical gas valve assembly 201. The horizontal float assembly 102 is connected via a fluid connection to a surge tank 106 or other connection to the overall gas processing system. Natural gas, petroleum liquids, or a combination of natural gas and petroleum liquids enters the horizontal float assembly 102 at the bottom of the housing 113 of the horizontal float assembly 102. The route to vent natural gas or other gaseous compounds is through the horizontal float assembly 102 and to the vertical gas valve assembly 201. For the natural gas to pass through the horizontal float assembly 102 and to the vertical gas valve assembly 201, the horizontal float assembly 102 is mechanically and fluidly connected to the vertical gas valve assembly 201 to permit natural gas and other gaseous components to leave the vertical gas valve assembly as described below. Embodiments of the Gas Vent 100 permit gas to be vented without the release of petroleum liquids.

The horizontal float assembly 102 is comprised of a housing 113; a horizontal float 103; a flange 104; a sight glass 105; one or more sight glass valves 115; a horizontal float lever arm 107; a vertical valve hinge arm 108, and a hinge 109. The horizontal float 103, the flange 104, the horizontal float lever arm 107, the vertical valve hinge arm 108, and the hinge 109 are all contained within the housing 113 of the horizontal float assembly 102.

The housing 113 of the horizontal float assembly 102 is essentially a large hollow process vessel with various openings and fittings formed by the housing 113 to accept the various devices and connections for the horizontal float assembly 102 to function including, without limitation, connections for the flange 104, the sight glass 105, the one or more sight glass valves 115, and the hinge 109. The connections for the flange 104 are threaded connections. The connections for the sight glass 105, the one or more sight glass valves 115, and the hinge 109 are welded connections.

The horizontal float 103 is a large, hollow vessel that partially floats on top of any liquid contained within the horizontal float assembly 102. In the embodiments of the Gas Vent 100, the horizontal float 103 is oriented horizontally. As the level of the petroleum liquid 116 contained in the horizontal float 103 rises or falls, the horizontal float 103 rises and falls in conjunction with the level of the petroleum liquid 116. One end of the horizontal float lever arm 107 is connected to one end of the horizontal float 103. The other end of the horizontal float lever arm 107 is connected to the hinge 109. The horizontal float lever arm 107 is then pivotally connected to the hinge 109 so that as the horizontal float 103 rises and falls, the horizontal float lever arm 107 pivots around the hinge 109. Connected to the horizontal float lever arm 107 essentially midway between the hinge 109 and the horizontal float 103 is the vertical valve hinge arm 108. The other end of the horizontal float lever arm 107 is connected to the lower float rod 202. The mechanical connection via the horizontal float lever arm 107 to the lower float rod 202 is what permits the Gas Vent 100 to allow or shut off natural gas venting.

The flange 104 serves to enclose an end of the housing 113. The flange 104 is affixed to the housing 113 via flange bolts 114. The flange 104 can be removed along with the horizontal float 103 for inspection and maintenance purposes. The flange 104 is removed horizontally and the horizontal float 103 is also removed horizontally. Once the flange 104 and horizontal float 103 are removed, access is available to the interior of the housing for inspection and maintenance.

As the horizontal float 103 rises and falls in conjunction with the level of the petroleum liquid 116, there is resultant buoyant force acting on the horizontal float 103. This buoyant force is transferred to the horizontal float lever arm 107 which in turn transfers the buoyant force to the vertical valve hinge arm 108. The vertical valve hinge arm 108 transfers the buoyant force to the lower float rod 202. The horizontal orientation of the horizontal float 103 allows a greater buoyant force to be transferred as indicated above than if the float were vertically oriented. Alternatively, the pressure of the gas above the horizontal float 103 forces the horizontal float 103 downward. The downward movement of the horizontal float 103 lowers the plunge valve 310 allowing gas to escape. The pressure of the fluids in the horizontal float assembly 102 is monitored via a pressure gauge 110.

The sight glass 105 is affixed via a weld to the side of the housing. The sight glass 105 is comprised of sight glass tube and flanges affixed to the sight glass tube affixed to both ends of the sight glass tube. The flanges allow for a fluid connection between the fluids in the housing and the sight glass tube. As the level of the petroleum liquid 116 in the housing rises and falls the level of the petroleum liquid 116 can be determined by observation of the level of the petroleum liquid 116 in the sight glass 105. The one or more sight glass valves 115 are connected via a welded connection to the sight glass 105 and allow for purging of material from the sight glass 105. Alternatively, the pressure of the gas above the horizontal float 103 forces the horizontal float 103 downward. The downward movement of the horizontal float 103 lowers the plunge valve 310 allowing gas to escape.

The vertical valve hinge arm 108 serves as the mechanical connection to the lower float rod 202 via the vertical hinge arm 108. More specifically, the vertical valve hinge arm 108 is connected to the horizontal float lever arm 107 via a hinge bracket 301 and a hinge pin 302. As the horizontal float 103 rises and falls due to the level of the petroleum liquid 116, the hinge pin 302 rotates freely, and transmits the vertical force from the horizontal float 103 to the vertical valve hinge arm 108 and to the lower float rod 202. Alternatively, the pressure of the gas above the horizontal float 103 forces the horizontal float 103 downward. The downward movement of the horizontal float 103 lowers the plunge valve 310 allowing gas to escape.

The lower float rod 202 extends downward from the vertical gas valve assembly 201 and is comprised of a steel all-thread rod. The bottom of the lower float rod 202 is weldedly affixed to the hinge bracket 301. The top of the lower float rod 202 is connected to the bottom of the upper float rod 303 via a connector nut 304. The upper float rod 303 is also comprised of steel all-thread rod.

The connector nut 304 is used to adjust the length of the lower float rod 202 and upper float rod 303 combinations by operation of the top half union 305, bottom half union 306 and the union hammer nut 307. While the Gas Vent 100 is in operation, the top half union 305 and bottom half union 306 are joined via the union hammer nut 307. The length of the length of the lower float rod 202 and upper float rod 303 combination can be adjusted by disengaging the union hammer nut 307 from the top half union 305 and bottom half union 306 and raising or removing the top portion of the housing of the vertical gas valve assembly 201 exposing the connector nut 304. Tightening or loosening the connector nut 304 will shorten or lengthen the lower float rod 202 and upper float rod 303 combination thereby changing the overall action of the Gas Vent 100.

The lower end of the upper float rod 303 is connected to the connector nut 304. Above connector nut 304 the upper float rod 303 supports two or more ball guides 308. The two or more ball guides 308 slide onto the upper float rod 303 and are held their desired location with standard nuts 309 threaded onto the all-thread comprising the upper float rod 303. The placement of the two or more ball guides 308 can be adjusted by changing the placement of the standard nuts 309.

The two or more ball guides 308 serve to keep the upper float rod 303 and lower float rod 202 centered in the vertical gas valve assembly 201. Further, the two or more ball guides 308 serve to prevent foreign matter from making its way up the vertical gas valve assembly 201 and clogging the operation of the Gas Vent 100. The two or more ball guides 308 are constructed of steel and are designed to be slight smaller in diameter than the inner diameter of the housing of the vertical gas valve assembly 201.

Connected to the upper float rod 303 above the two or more ball guides 308 is the plunge valve 310. The vertical action of the lower float rod 202 and upper float rod 303 combination engages the plunge valve 310 with the valve seat 311. In one embodiment of the Gas Vent 100, the plunge valve 310 is constructed from steel and is threadedly or weldedly affixed to the top of the upper float rod 303. In another embodiment of the Gas Vent 100, the plunge valve 310 and the valve seat 311 are constructed from a non-magnetizable material such as materials including, without limitation, brass, ceramic or nylon.

The plunge valve 310 is constructed to mate with the valve seat 311. The plunge valve mating surface 318 of the plunge valve 310 mates with the valve seat mating surface 319. The valve seat mating surface 319 is formed by the valve seat 311 and the plunge valve mating surface 318 of the plunge valve 310 are machined such that when the plunge valve 310 is engaged into the valve seat 311 only a small portion of the plunge valve mating surface 318 contacts the valve seat mating surface 319 which is approximated by a small circular area. This small circular area of contact is accomplished by the plunge valve mating surface 318 being of a different angle than the valve seat mating surface 319.

On the sides of the plunge valve 310 are formed plunge valve channels 203. The plunge valve channels 203 provide the fluid connection for the natural gas to flow from the housing 113 up through the gas valve assembly 201 and out the top of the housing 113.

The valve seat 311 is mounted in the top portion of the upper gas valve housing 312. The valve seat 311 rests on top of the lower gas valve housing 320. The inside diameter of the upper gas valve housing 312 is larger than the outside diameter of the center gas valve housing 313. The outside diameter of the valve seat 311 is smaller than the inside diameter of the upper gas valve housing 312. The outside diameter of the valve seat 311 is larger than the outside diameter of the center gas valve housing 313. The valve seat 311 is held in place from below by the center gas valve housing 313. The valve seat 311 is held in place from above by an O-ring 314, an O-ring adapter 315, and a jam nut 316. In an alternative embodiment, a spacer 317 is located between the jam nut 316, and the O-ring adapter 315. When the jam nut 316 is engaged it squeezes the O-ring adapter 315, the O-ring 314 and the valve seat 311 down onto the shoulders of the center gas valve housing 313. The jam nut 316 is threadedly affixed to the inside of the of the upper gas valve housing 312.

The center gas valve housing 313 is threadedly affixed to the top half union 305. The top half union 305 is connected to the bottom half union 306 when engaged with the union hammer nut 307. The union hammer nut 307 secures together the top half union 305 and the bottom half union 306. The bottom half union 306 is threadedly engaged to the lower gas valve housing 320 which serves as a fluid connection to the housing 113.

In the best mode of operation of the Gas Vent 100, the Gas Vent 100 is mounted on top of a surge tank 106 or other appropriate gas processing vessel that contains natural gas fluids. Presumably, the natural gas fluids contain both gas and liquids, and the Gas Vent 100 is designed to allow the gases to vent without the presence of substantial quantities of liquids. If liquids are present, including any liquids entrained with the gas, the gas/liquid mixture enters the Gas Vent 100 via the housing 113. If there is not a significant amount of liquid present, the horizontal float 103 will not rise substantially and engage the plunge valve 310 into the valve seat 311. If additional liquid enters the Gas Vent 100 and collects in the housing 113, the horizontal float 103 will be elevated. The elevation of the horizontal float 103 causes the horizontal float lever arm 107 to force upward the vertical valve hinge arm 108. Forcing the vertical valve hinge arm 108 upwards causes the lower float rod 202, upper float rod 303, and the plunge valve 310 to be forced upward. If enough liquid enters the housing 113, the plunge valve 310 is seated into the valve seat 311 closing off the available exit to the Gas Vent 100 thereby preventing liquid petroleum fluids from exiting with gaseous natural gas. As the level of the petroleum liquid 116 falls, the reverse occurs and the plunge valve 310 opens the aperture in the valve seat 311 allowing gas to exit the Gas Vent without liquids.

When oil, water, and gas leave and well it is necessary to meter the volumes of each of the components produced. For well testing results, the oil water, and gas must have separate meters. The water and oil can be separated and each one metered separately by using a well test such as that described in U.S. Pat. No. 6,736,964. Prior to the water and oil entering into the well tester, all the gas must be removed from the liquids.

Although one best mode of operation of the Gas Vent 100 is in oil-field applications, the Gas Vent 100 can be used in any application requiring the separation of a gas phase from a liquid phase. These applications include, without limitation, other oil-field applications and agricultural applications such as irrigation.

Previous methods have employed various devices that permit too much oil droplets to escape with the removal of the gas, and also do not remove all of the gas. This gas vent assembly was primarily invented to remove all natural gas from a pipeline from an oil well 112 prior to the fluid entering into well testers including without limitation the Well Tester described in U.S. Pat. No. 6,736,964. If gas is allowed to enter into the tester, the gas will remain with the oil and then pass through the oil meter and give incorrect testing results. All the fluids and the gas in the fluids first enter into a vertical surge tank at the upper end of the surge tank. All the liquids exit at the lower end of the surge tank which traps the gas at the upper end of the tank and allows the gas to enter into the gas vent assembly. The gas vent assembly only processes the fluids that come from the tubing in the well, not the gas coming from the annulus of the well. When fluid (oil and water and gas) enters the vent assembly the float will rise to a point in which the plunger valve will close.

At first closing the fluid in the vent assembly will be at a lower level in the housing as shown by the sight glass 105. Fluid will continue to enter the housing and compress the upper gas cap until the gas cap becomes the same pressure as the line pressure in the well tester feed line 111. The sight glass 105 will show more fluid in the housing at that point. When the gas entering the housing overcomes the necessary pressure and normalizes to push against the fluid around the float and above the float it will gently push the float down and separate the plunger valve from the seat and allow the gas to escape in a smooth manner as pressure is involved in the process. By the float being in the horizontal position the float has enough leverage to let the process work where a vertical float will not work. This vent assembly will allow the gas to be removed under higher pressures. The pressure in the housing can be monitored via a pressure gauge.

If there is no natural gas entering the vent assembly with the liquids (natural gas liquids and oil) the float will remain in a stable position as long as the line pressure is stable. If natural gas begins entering the surge tank and rises into the vent assembly, the gas will collect above the float and will continue to collect until there is a large enough gas cap pressure to gently push the horizontal float down, which will gently pull the plunger valve down from the seat and let the gas exit the vent assembly, at about the same volumetric flow rate as the gas entering into the vent assembly. This process works in a smooth manner, as the line pressure may run from 10 psi up to 200 psi in some cases, and can be more.

In the case of a sudden change in the line pressure, the following occurs. As the line pressure increases, the gas cap gets smaller and will not vent gas until enough gas has collected in the gas cap to lower the float. As the line pressure decreases, the gas cap gets large, and will vent the gas necessary for the gas cap to be the same pressure as the line pressure.

I claim:
1. A gas vent comprising
   a. a horizontal float assembly;
   b. a vertical gas valve assembly;
   c. wherein the horizontal float assembly is comprised of
      i. a housing;
      ii. a horizontal float;
      iii. a flange;

iv. a sight glass;
v. one or more sight glass valves;
vi. a horizontal float lever arm;
vii. a vertical valve hinge arm; and
viii. a hinge;
d. wherein the vertical gas valve assembly is comprised of
i. hinge connection means;
ii. a lower threaded shaft;
iii. a connector nut;
iv. a plurality of standard nuts used to secure the connector nut;
v. a union comprised of a top half union, a bottom half union, and a union hammer nut;
vi. two or more ball guides;
vii. a plurality of standard nuts used to secure the ball guides;
viii. a center gas valve housing;
ix. a plunge valve; wherein on the vertical surface of the plunge valve is formed plunge valve channels that allows the gas to be vented to flow around the plunge valve;
x. a valve seat;
xi. an O-ring;
xii. an O-ring adapter;
xiii. a spacer;
xiv. an upper gas valve housing; and
xv. a jam nut.

2. The gas vent as described in claim 1 wherein the horizontal float assembly is essentially a large hollow process vessel with openings and fittings formed by the housing to accept devices and connections including connections for a flange, a sight glass, one or more sight glass valves, and a hinge.

3. The gas vent as described in claim 2 wherein the connections for the flange are threaded connections and wherein the connections for the sight glass, the one or more sight glass valves, and the hinge are welded connections.

4. The gas vent as described in claim 3
a. wherein the horizontal float partially floats on top of any liquid contained within the horizontal float assembly;
b. wherein the horizontal float is oriented horizontally;
c. wherein as the liquid contained in the horizontal float assembly rises or falls, the horizontal float rises and falls in conjunction with the level of the petroleum liquid;
d. wherein one end of the horizontal float lever arm is connected to the horizontal float;
e. wherein the other end of the horizontal float lever arm is connected to the hinge;
f. wherein the horizontal float lever arm is pivotally connected to the hinge so that as the horizontal float rises and falls, the horizontal float lever arm pivots around the hinge;
g. wherein one end of the vertical valve hinge arm is connected to the horizontal float lever arm essentially midway between the hinge and the horizontal float;
h. wherein the other end of the horizontal float lever arm is connected to the lower float rod;
i. wherein the mechanical connection via the float lever arm to the lower float rod is what permits the gas vent to allow or stop the gas from venting.

5. The gas vent as described in claim 4
a. wherein the sight glass is affixed via a weld to the side of the housing;
b. wherein the sight glass is comprised of sight glass tube and flanges affixed to the sight glass tube affixed to both ends of the sight glass tube;
c. wherein the flanges allow for a fluid connection between the fluids in the housing and the sight glass tube;
d. wherein as the liquid level in the housing rises and falls the liquid level can be determined by observation of the liquid level in the sight glass; and
e. wherein the one or more sight glass valves are connected via a welded connection to the sight glass and allow for purging of material from the sight glass.

6. The gas vent as described in claim 5
a. wherein the flange serves to enclose an end of the housing;
b. wherein the flange is affixed to the housing via flange bolts;
c. wherein the flange can be removed along with the horizontal float for inspection and maintenance purposes;
d. wherein the flange is removed horizontally and the horizontal float is also removed horizontally; and
e. wherein once the flange and horizontal float are removed, access is available to the interior of the housing for inspection and maintenance.

7. The gas vent as described in claim 6
a. wherein the vertical valve hinge arm serves as the mechanical connection to the lower float rod via the vertical hinge arm;
b. wherein the vertical valve hinge arm is connected to the horizontal float lever arm via a hinge bracket and a hinge pin; and
c. wherein the horizontal float rises and falls due to the level of the petroleum liquid, the hinge pin rotates freely, and transmits the vertical force from the horizontal float to the vertical hinge arm and to the lower float rod.

8. The gas vent as described in claim 6
a. wherein the vertical valve hinge arm serves as the mechanical connection to the lower float rod via the vertical hinge arm;
b. wherein the vertical valve hinge arm is connected to the horizontal float lever arm via a hinge bracket and a hinge pin; and
c. wherein the pressure of the gas above the horizontal float forces the horizontal float downward; and
d. wherein the downward movement of the horizontal float lowers the plunge valve allowing gas to escape.

9. The gas vent as described in claim 8
a. wherein the lower float rod extends downward from the vertical gas valve assembly and is comprised of a steel all-thread rod;
b. wherein the bottom of the lower float rod is weldedly affixed to the hinge bracket; and
c. wherein the top of the lower float rod is connected to the bottom of the upper float rod via a connector nut; and wherein the upper float rod is also comprised of steel all-thread rod.

10. The gas vent as described in claim 1
a. wherein the sight glass is affixed via a weld to the side of the housing;
b. wherein the sight glass is comprised of sight glass tube and sight glass flanges affixed to both ends of the sight glass tube;
c. wherein the sight glass flanges allow for a fluid connection between the fluids in the housing and the sight glass tube;
d. wherein as the liquid level in the housing rises and falls the liquid level can be determined by observation of the liquid level in the sight glass; and
e. wherein the one or more sight glass valves are connected via a welded connection to the sight glass and allow for purging of material from the sight glass.

11. The gas vent as described in claim 1
a. wherein the flange serves to enclose an end of the housing;
b. wherein the flange is affixed to the housing via flange bolts;
c. wherein the flange can be removed along with the horizontal float for inspection and maintenance purposes;
d. wherein the flange is removed horizontally and the horizontal float is also removed horizontally; and
e. wherein once the flange and horizontal float are removed, access is available to the interior of the housing for inspection and maintenance.

12. The gas vent as described in claim 1
a. wherein the vertical valve hinge arm serves as the mechanical connection to the lower float rod via the vertical hinge arm;
b. wherein the vertical valve hinge arm is connected to the horizontal float lever arm via a hinge bracket and a hinge pin; and
c. wherein the horizontal float rises and falls due to the level of the petroleum liquid, the hinge pin rotates freely, and transmits the vertical force from the horizontal float to the vertical hinge arm and to the lower float rod.

13. The gas vent as described in claim 1
a. wherein the vertical valve hinge arm serves as the mechanical connection to the lower float rod via the vertical hinge arm;
b. wherein the vertical valve hinge arm is connected to the horizontal float lever arm via a hinge bracket and a hinge pin;
c. wherein the pressure of the gas above the horizontal float forces the horizontal float downward; and
d. wherein the downward movement of the horizontal float lowers the plunge valve allowing gas to escape.

14. The gas vent as described in claim 1
a. wherein the lower float rod extends downward from the vertical gas valve assembly and is comprised of a steel all-thread rod;
b. wherein the bottom of the lower float rod is weldedly affixed to the hinge bracket;
c. wherein the top of the lower float rod is connected to the bottom of the upper float rod via a connector nut; and
d. wherein the upper float rod is also comprised of steel all-thread rod.

* * * * *